United States Patent
Wipasuramonton et al.

(10) Patent No.: US 6,220,629 B1
(45) Date of Patent: Apr. 24, 2001

(54) CUSHION WITH INCREASED SEAM STRENGTH AND METHOD OF ASSEMBLY

(75) Inventors: Pongdet P. Wipasuramonton, Rochester; Robert Tobian, New Baltimore, both of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/296,088

(22) Filed: Apr. 21, 1999

(51) Int. Cl.[7] .................................................. B60R 21/16
(52) U.S. Cl. ................................... 280/743.1; 280/728.1; 280/730.2
(58) Field of Search ............................. 280/728.1, 743.1, 280/743.2, 729, 730.2; 383/3; 5/681, 706, 707

(56) References Cited

U.S. PATENT DOCUMENTS

| | | | |
|---|---|---|---|
| 5,114,180 | * | 5/1992 | Kami et al. ......................... 280/743.1 |
| 5,630,620 | * | 5/1997 | Hirai et al. ......................... 280/743.1 |
| 5,782,489 | * | 7/1998 | LaLonde et al. ................... 280/743.1 |
| 5,909,895 | * | 6/1999 | Iino et al. .......................... 280/743.1 |
| 6,106,004 | * | 8/2000 | Heinz et al. ....................... 280/730.2 |
| 6,113,141 | * | 9/2000 | Baker ................................. 280/743.2 |

FOREIGN PATENT DOCUMENTS

| | | |
|---|---|---|
| 25 52 815 | 5/1977 | (DE) . |
| 0 901 940 | 3/1999 | (EP) . |
| 0 962 363 A1 * | 8/1999 | (EP) . |
| 2 314 051 | 12/1997 | (GB) . |
| 2-162134 * | 6/1990 | (JP) . |
| 9-226498 * | 9/1997 | (JP) . |
| 10-102029 * | 4/1998 | (JP) . |

* cited by examiner

*Primary Examiner*—Lanna Mai
*Assistant Examiner*—Ruth Ilan
(74) *Attorney, Agent, or Firm*—Markell Seitzman

(57) ABSTRACT

An inflatable cushion (100,100a) includes a first panel (22a) and a second panel (22b) attached together along a peripheral joint. The joint (30) is subjected to a shearing or peeling load upon inflation of the cushion tending to separate the panels. Each of the first and second panels includes a first layer (24) of flexible structural material and a second (26) bondable layer. A reinforcement (50) is provided to prevent the joint (30) from separating. The reinforcement includes first (52a) and second (52b) strips of material, each having a structural layer (24a) and a bondable layer (26a). The first and second strips are sewn together at a seam (56a) to retard separation of the strips. The seam (56a) separates each of the strips into two portions. The structural layers of the strips face each other and the bondable layers of the strips face outwardly abutting a corresponding bondable layer of one of the first and second panels. The bondable layers of the first and second strips are joined on one or both sides of the seam to a corresponding bondable layer of the first and second panels.

8 Claims, 9 Drawing Sheets

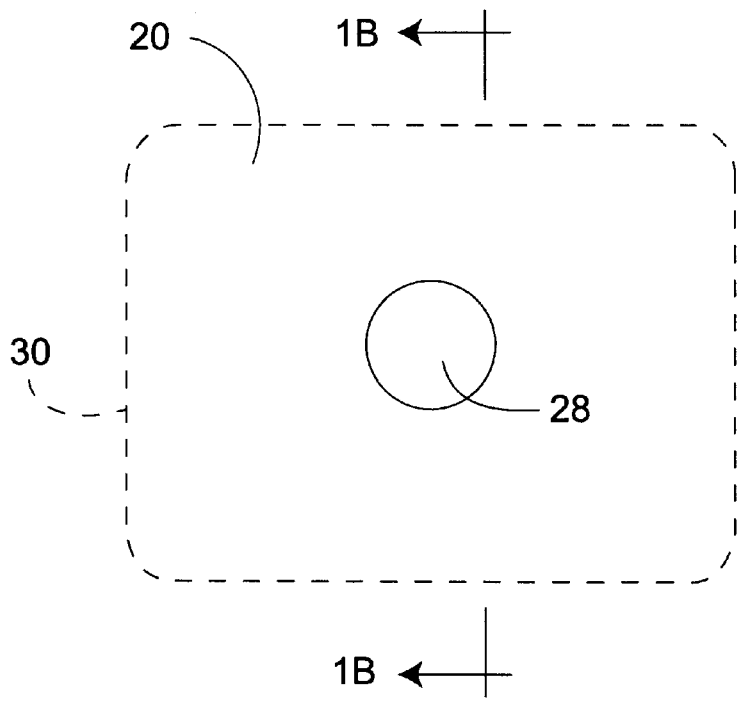
Fig. 1A
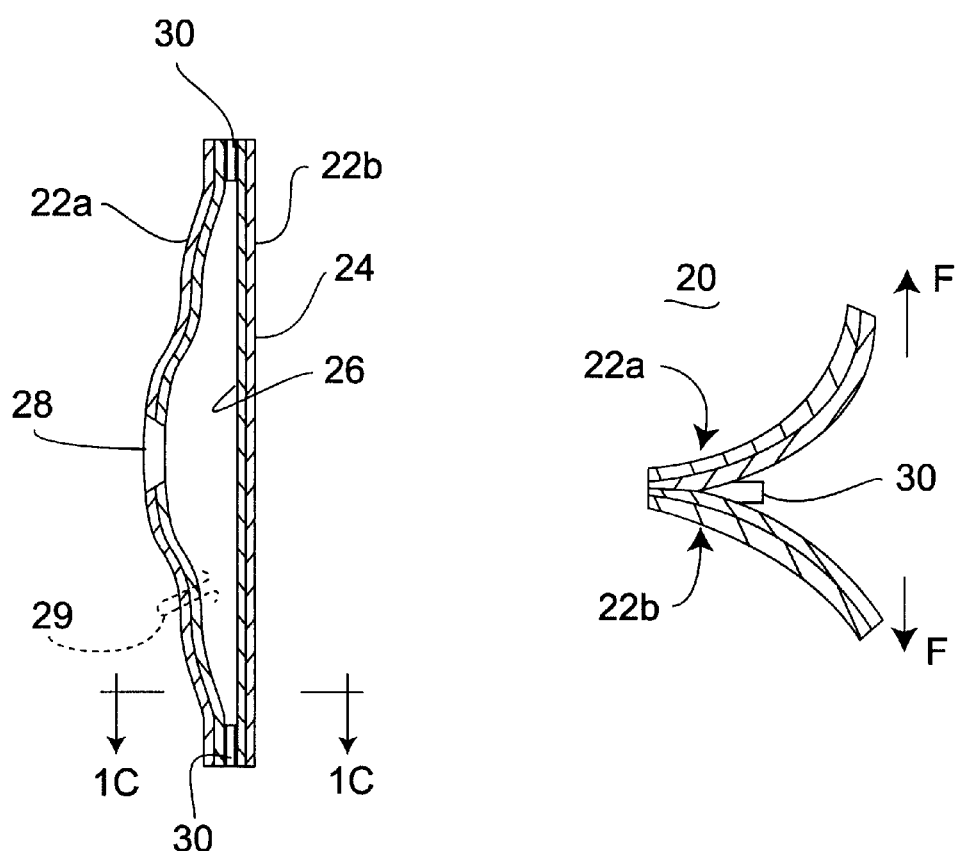
Fig. 1B
Fig. 1C

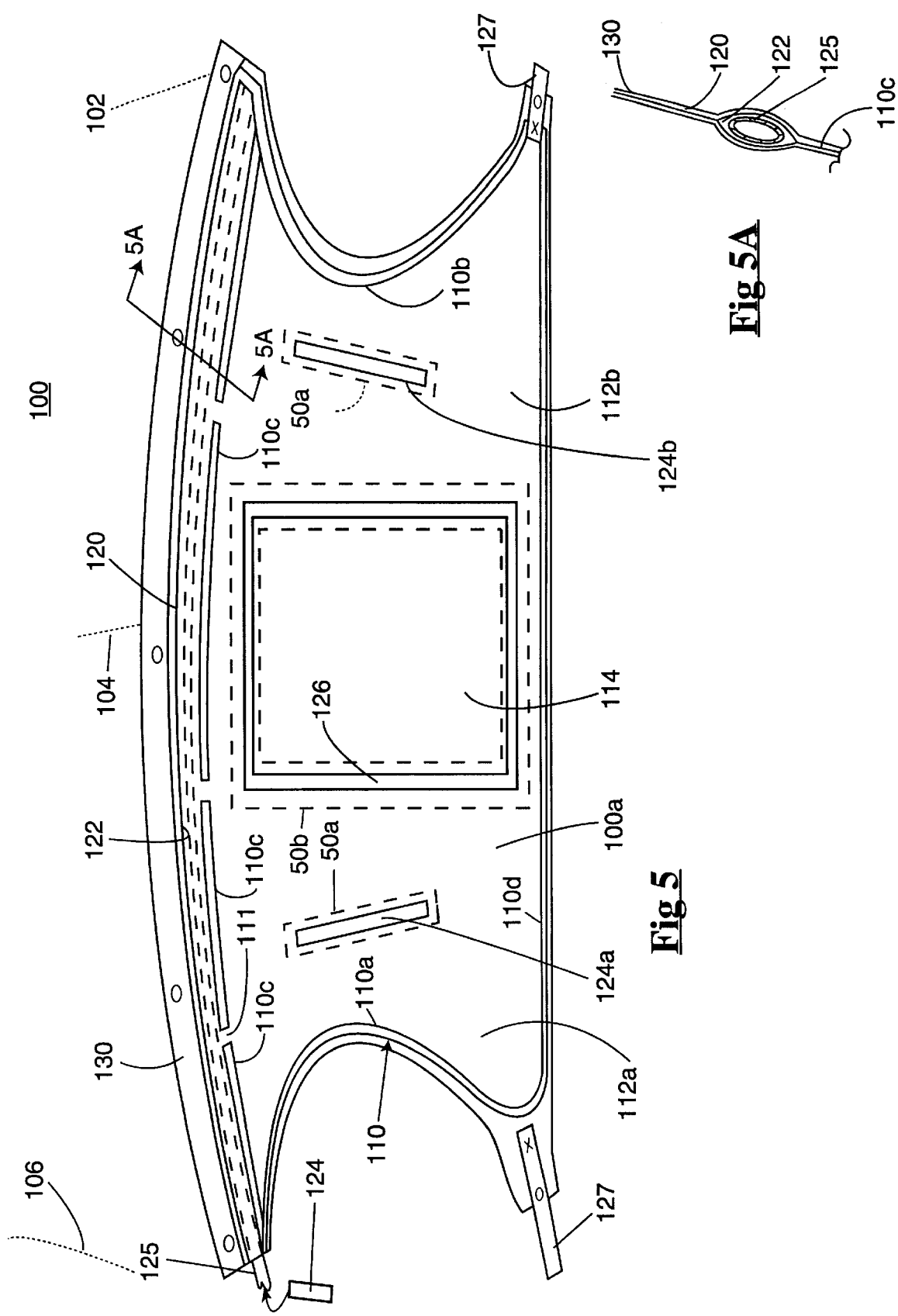

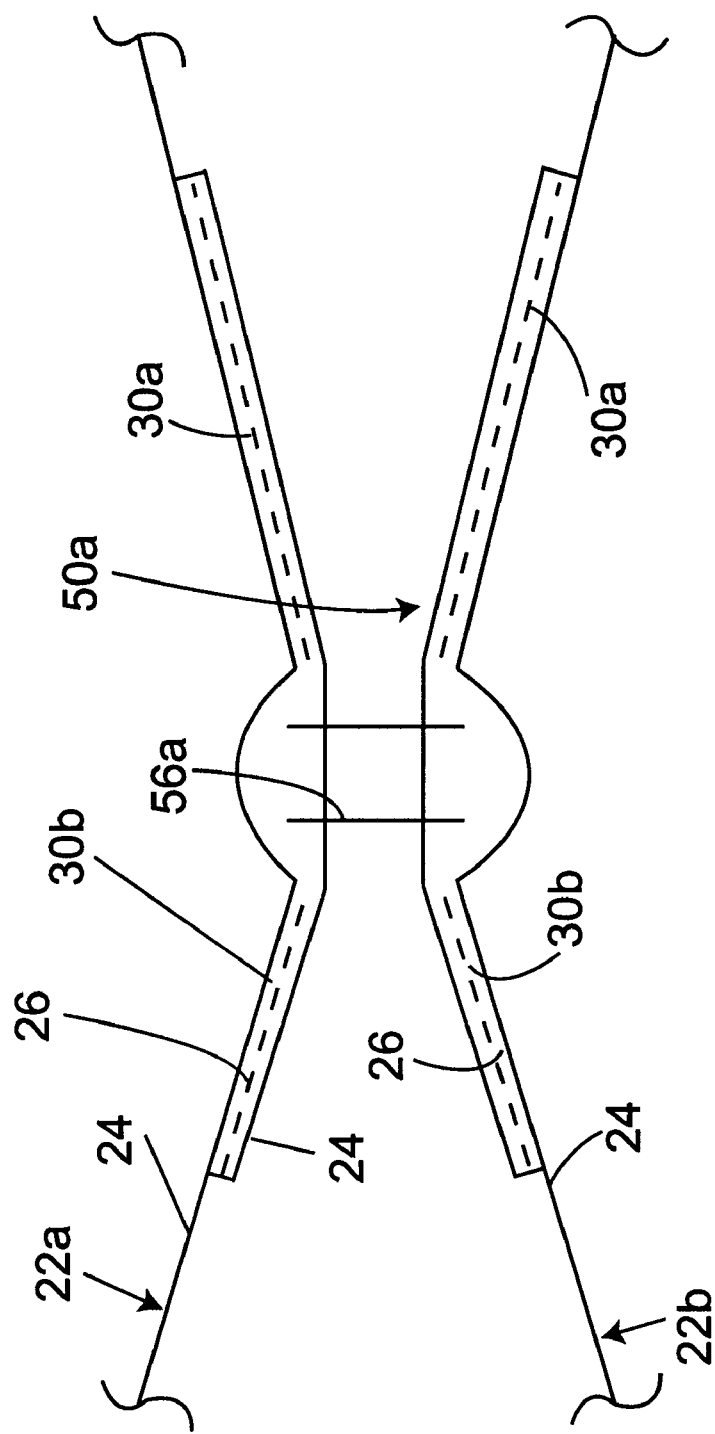

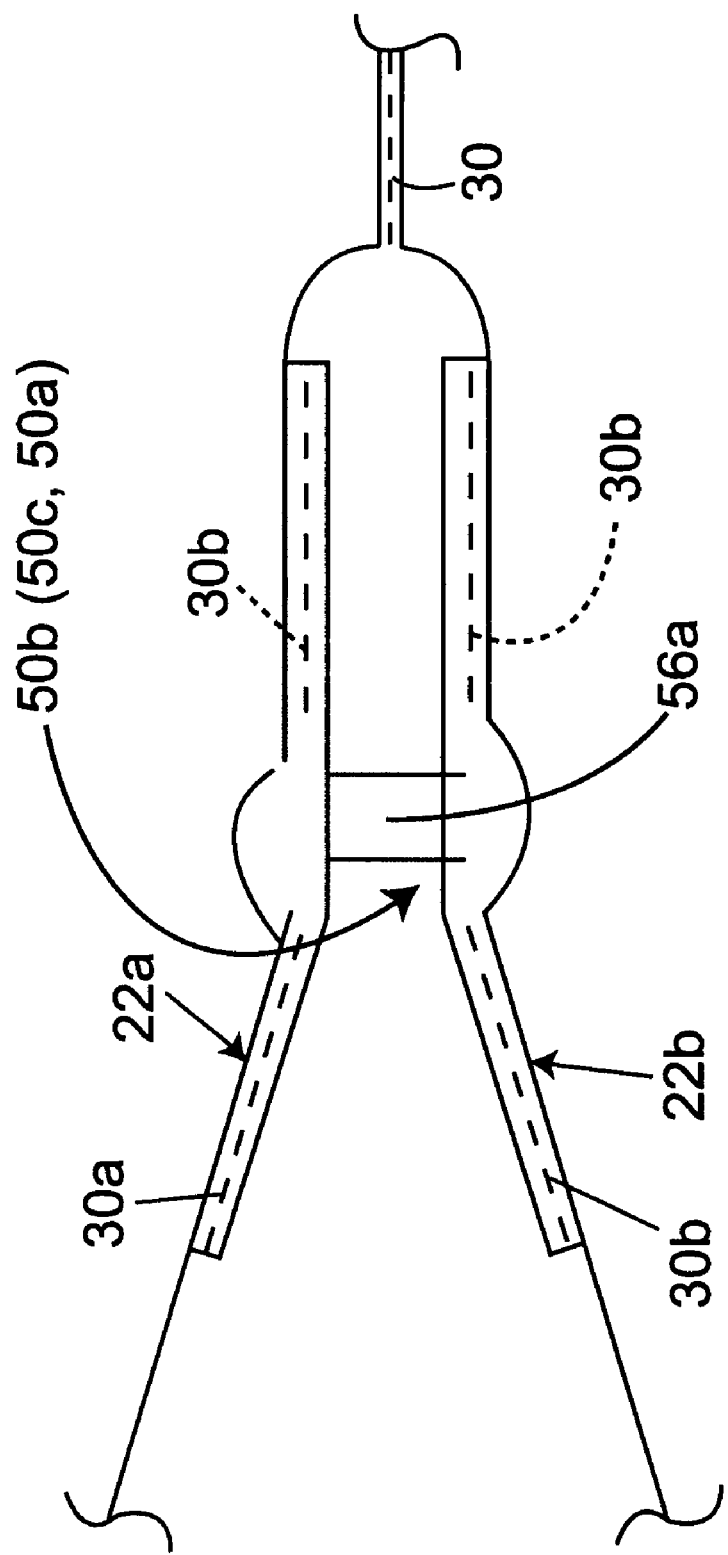

CUSHION WITH INCREASED SEAM STRENGTH AND METHOD OF ASSEMBLY

BACKGROUND AND SUMMARY OF THE INVENTION

The invention generally relates to inflatable cushions such as air bags and other inflatable products. The present invention is also related to a method of creating a reinforced joint or seal connecting two pieces of laminated or coated material used to form the cushion.

The present invention is useful with various products comprising two joined, sealed, bonded or laminated fabrics where the seam or seal is subject to high and/or sudden pressure loads.

Numerous products, such as inflatable air bags, cushions and mattresses, are made of bonded, coated or laminated material. Adjacent pieces of material are attached at a joint, seam or seal by welding, gluing or otherwise bonding the material together.

The primary embodiment of the invention is as an inflatable air bag using laminated or coated fabrics having low or zero permeability to enable the bag to retain its pressure for a relatively long period of time. This type of bag is useful in providing occupant protection during a vehicle rollover or multiple impact accident or an event that requires the cushion to be inflated for a long duration. To retain the bag pressure, the various panels of material forming the bag are coated with a polyurethane or other bondable coating. These panels are then joined together. As is known in the art, the panels can be sewn together, however, the resulting needle holes will create leak paths for the inflation gas. Alternatively, the panels can be glued or welded together such as by using sonic, RF (radio frequency) or other heat welding techniques. This type of construction (gluing or welding) eliminates the needle holes of the sewn construction, however, the resulting welded or glued joints can be pulled apart relatively easily. The present invention provides a method and apparatus for reinforcing these bonded (glued or welded) joints. The efficiency of manufacture is also an important aspect of any product. As will be apparent from the description below, an air bag (generically a cushion) can be assembled on a flat work surface with a minimal amount of manipulation of the various parts of the air bag.

It is an object of the present invention to provide a cushion with an improved joint for strength and ease of manufacturing.

Accordingly the invention comprises: an inflatable cushion comprising: a first panel and a second panel attached together generally along a peripheral joint to form the inflatable cushion. The joint is subjected to a peeling load upon inflation of the cushion which tends to separate the joint. Each of the first and second panels includes a first layer comprised of a flexible, structural material and a second, bondable layer. The bondable layer is formed of material that is joinable to an adjacent, facing bondable layer to form the joint. Reinforcement means are provided for preventing the joint from separating. The reinforcement means includes a first strip of material having a structural layer and a bondable layer, and a second strip of material having a structural layer and a bondable layer. The first and second strips are overlaid and sewn together at a seam to retard separation of the strips. The seam separates each of the strips into two portions, wherein the structural layers face each other and the bondable layers face outwardly facing a corresponding bondable layer of the first and second panel. The bondable layers of the first and second strips are joined on one side or both sides of the seam to a corresponding bondable layer of one or the other panel.

Many other objects and purposes of the invention will be clear from the following detailed description of the drawings.

BRIEF DESCRIPTION OF THE DRAWINGS

In the drawings:

FIGS. 1A, 1B and 1C illustrate an inflatable cushion with a peripheral bonded or welded joint.

FIG. 5 is a plan view of a side impact air bag for head protection.

FIG. 5A is a partial cross-sectional view through section line 5A—5A of FIG. 5.

FIGS. 7A and 7B illustrate various reinforcement joints used in the manufacture of the cushion of FIG. 1 or 5.

DETAILED DESCRIPTION OF THE DRAWINGS

Figure 2A:
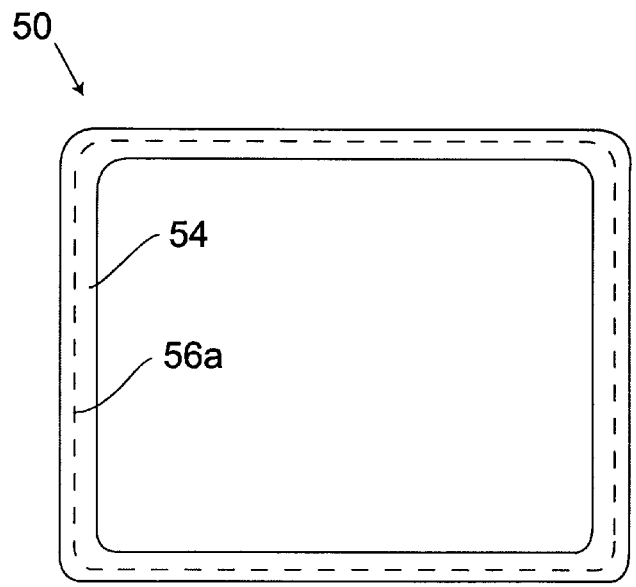
FIGS. 2A and 2B illustrate various views of a reinforcement member.

Reference is made to FIGS. 1A–1C which illustrate an exemplary inflatable cushion 20. While a square shaped cushion is shown, other shapes including circular, oval or rectangular can be used with the present invention. The cushion represents an air bag formed of two joined material panels 22a and 22b respectively. In the preferred embodiment each panel is the mirror image of each other with a coated side facing each other. As used herein, the panels can be formed by separate pieces of material or formed using one piece of material folded in half. Each panel comprises a multi-layered construction having a structural layer 24 and a bondable layer 26. For example, if the cushion 20 were used as an air bag, the structural layer may comprise 420 denier nylon or polyester woven material. The bondable layer 26 comprises a thin layer of elastomer such as polyurethane, polyethylene, vinyl or nylon. One of the panels, such as 22a, includes a central opening 28. As is known by those skilled in the art, such an opening is used to enable the placing of a part of an inflator within the air bag. The inflator produces or releases inflation gas to fill the air bag. The cushion configuration shown in FIGS. 1A and 1B is exemplary of a driver side air bag. If, for example, the cushion 20 is used for some other purpose, the opening 28 would be removed and replaced by a fill tube 29 that is appropriately sealed to one of the panels of material 22a or 22b and communicated to a source of pressurized fluid such as an air compressor. It should be noted that the thickness of the various layers 24 and 26 has been exaggerated for the purpose of illustration. Further, FIG. 1C is an enlarged view of the edge joint of the air bag of FIG. 1B.

Figure 4A:
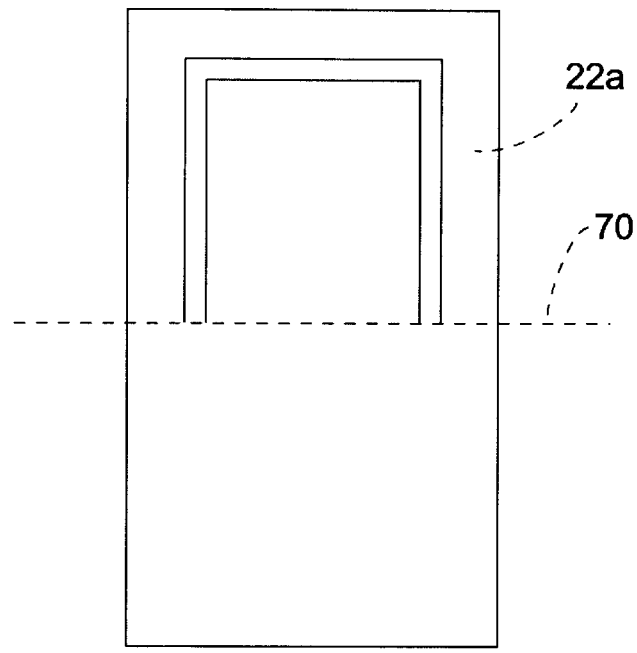
FIGS. 4A and 4B illustrate an alternate embodiment of the invention.
Figure 4B:
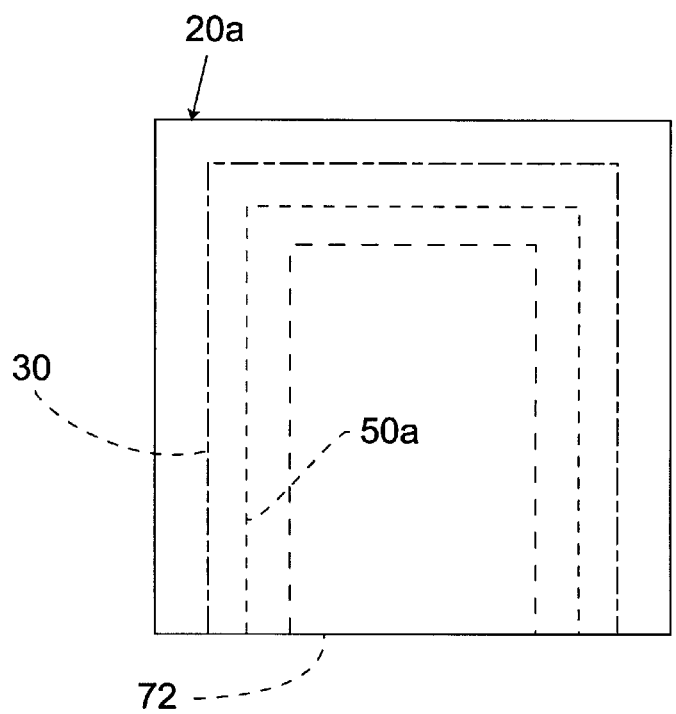

The panels 22a and 22b are joined together at a peripheral edge joint, seal or seam generally shown as 30. As mentioned above, the panels 22a and 22b may be formed using two separate pieces of fabric that is joined together along all common sides. Alternately, and as shown in FIGS. 4A and 4B the two panels are formed from a single piece of material. In this one piece construction the peripheral joint does not extend completely about all of the common sides as in this cushion, one of the sides (or portion thereof) is formed by the folded-over portion of the single piece of material. The joint 30 may be achieved by heat welding, radio frequency (RF) welding or by adhering means such as gluing the panels together. As shown in FIG. 1B, the sealable or bondable layers 26 for each of the panels such as 22a and 22b are laid upon each other such that when subjected to radiant energy, the bondable (for example polyurethane) coating will bond together at the molecular level. As mentioned above, the panels can also be adhesively (glued) bonded together.

When the cushion 20 is inflated, the peripheral joint 30, as well as any interior joint, is subject to a peel load which tends to pull the panels apart. This phenomenon is illustrated in FIG. 1C. More particularly, as the cushion 20 is inflated, the various panels are subject to an outwardly expanding force generally shown as F. The components of this force act oppositely and tend to rip or peel the panels apart from one another. If the internal inflation pressure of the cushion is sufficiently high or, in some situations, if the rate of pressure change is sufficiently abrupt, the joint 30 could fail. One obvious solution to increase the strength of the joint (seam or seal) 30 is to reinforce the joint with a sewn seam. However, as can be appreciated, this type of construction can create a series of small punctures in the panels forming leak paths through which the inflation gas or fluid can escape.

Reference is made to FIGS. 2A and 2B, and 3A and 3B which illustrate a reinforcement member 50 useful in reinforcing the joint 30, such member being resistant to peel forces. One important aspect of the invention is that this reinforcement member 50 is located interior of the joint 30. Consequently, no leak paths are formed.

Figure 2B:
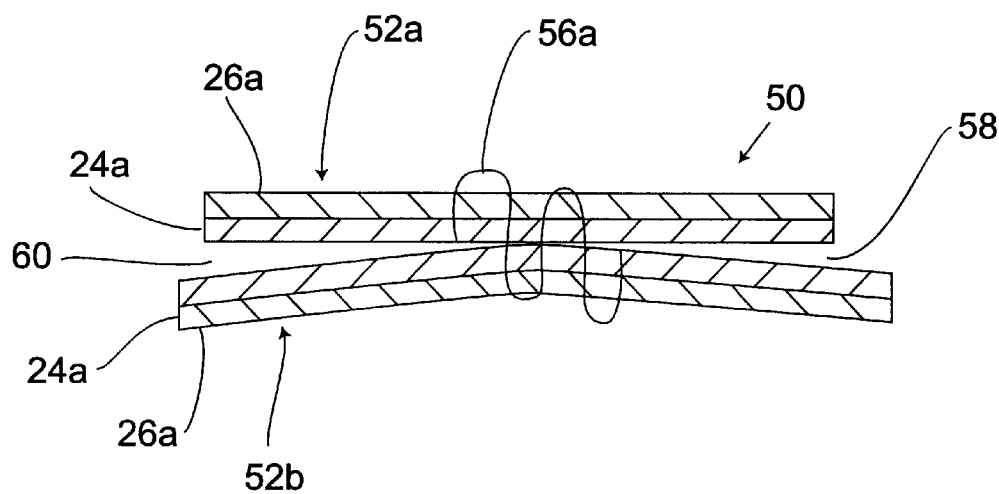
Figure 3A:
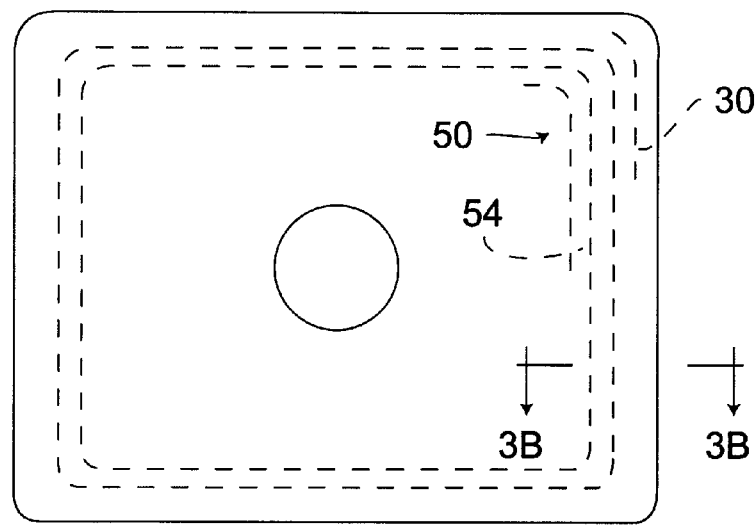
FIG. 3A is a plan view of a cushion utilizing the present invention.

More particularly, the reinforcement member 50 comprises two layers or strips of opposed material 52a and 52b formed in a designated pattern, straight, curved, open, closed, etc., conforming to the joint to be reinforced. The strips 52a and b include a structural layer 24a such as woven nylon and a bondable layer 26a such as a coating or laminated layer of, for example, polyurethane. In the preferred embodiment the material is of similar construction to the panels 22a and 22b but can be made using a different gage or thickness of structural and bondable layers. Since the joint 30, of FIG. 1A or 2A, that is to be reinforced extends about the perimeter of the panels of material 22a and 22b, the reinforcement member 50 is of a similar, closed shape. The reinforcement member 50 comprises a rectangular shaped, annular band of material generally shown by numeral 54. The dimensions are chosen so that the band 54 will fit within the joint or seal 30. This interrelationship is shown in FIG. 3A. The strips 52a and 52b forming the band 54 can be made of one piece or a plurality of connected or sewn pieces of material. The strips 52a and 52b are laid upon one another such that the structural layer 24a of each strip 52a and 52b face each other. As can be seen in FIG. 2B, the bondable layers 26a form the top and bottom of this construction. With the strips 52a and b in place, they are sewn together by thread 56. The peripheral seam 56a, formed by the thread 56 as shown in FIG. 2A, can be any acceptable seam construction such as single, double, lock stitch, etc. As can be seen from FIG. 2B, the seam 56a separates each strip, of the reinforcement member 50, into right (or inner) 58 and left (or outer) 60 segments.

The band 54 is then placed on the coated layer 26 of panel 22b and positioned to lie interior of the desired location of the joint (bond or seal) 30. Panel 22b is appropriately secured upon a work surface. The reinforcement member 50 can be tack welded to the panel 22b at various locations to hold it in place. For example, the location of the tack weld can be on the sewn seam or slightly offset therefrom so as not to interfere with other bonding processes. The other panel 22a is placed upon the first or under panel 22b as well as upon the reinforcement member 50 (formed as the band 54) and appropriately secured in place.

Figure 3B:
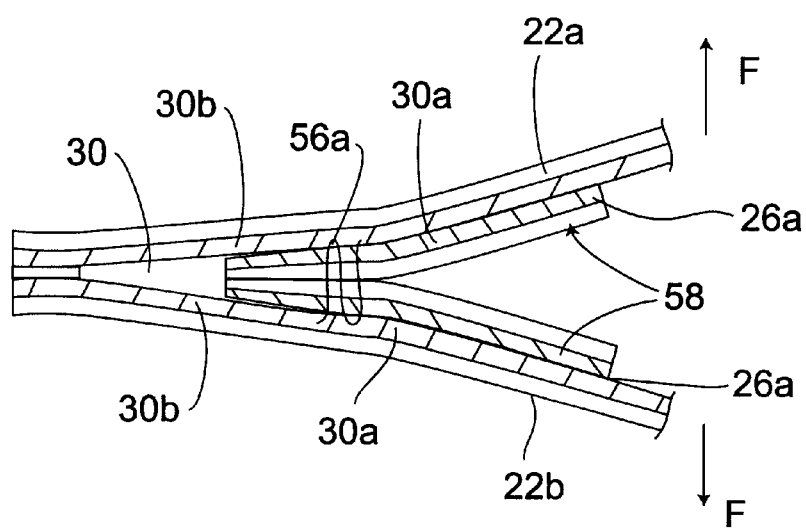
FIG. 3B is a cross-sectional view through section lines 3B—3B of FIG. 3A.

Thereafter, bonding energy, such as RF, sonic, friction or heat energy, is focused or otherwise applied on the fabric to seal the reinforcement member 50 to the panels. Either subsequently or simultaneously, the joint 30 can be formed joining the edges of the panels 22a and 22b together. FIG. 3B shows the reinforcement member 50 secured to the panels 22a and 22b. The inner segment 58 of each bondable layer 26a, of the reinforcement member 50 is shown joined to the mating portion of the bondable layer 26 of a respective panel 22a or 22b at joint or seal 30a, which is located on the inside of the seam 56a. While it is not necessary to bond the outside portions 60 (of the reinforcement member 50) of the bondable layers 26a of each reinforcement strip 52a and 52b to the panels 22a and 22b, this may be done as an alternate embodiment of the invention. Numeral 30b designates the location of this exterior joint on the outside (or left side as viewed in FIG. 3B) of the seam 56a. The joint 30 is also shown.

Figure 3C:
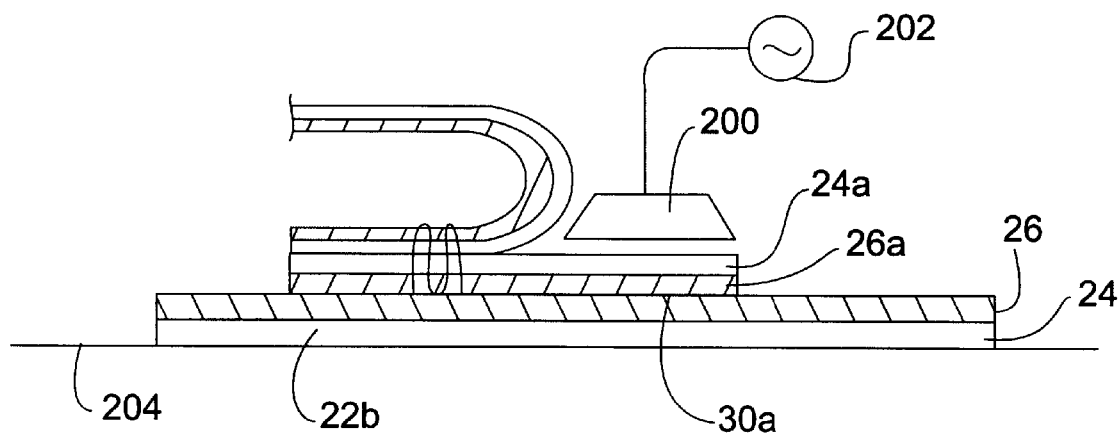
FIGS. 3C and 3D show panels being bonded together.
Figure 3D:
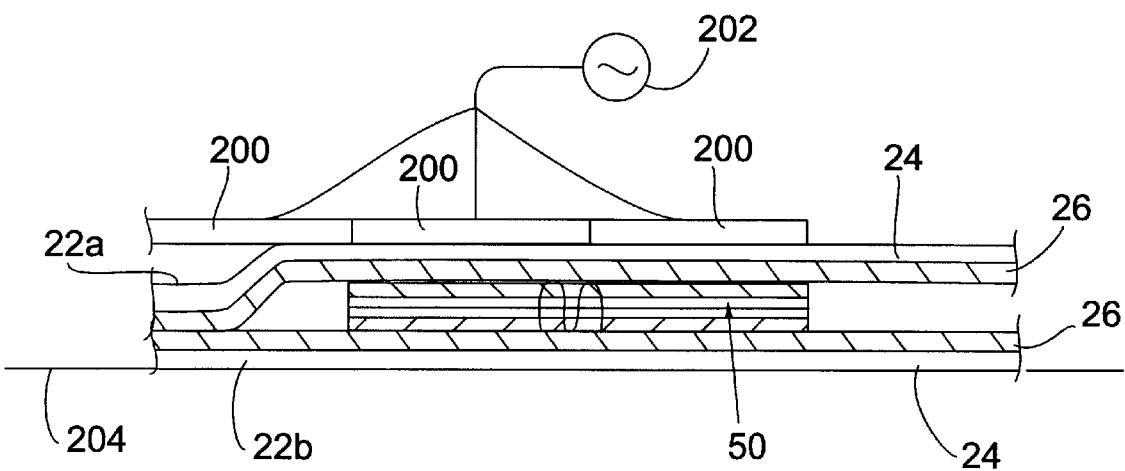

The panels 22a and 22b and the reinforcement member 50 can be secured together in a number of different ways. Various bonding techniques are well known and need not be discussed in any detail. As an example, after locating the reinforcement member 50 upon panel 22b (located on work surface 204), see FIG. 3C, an RF generator 200 can be inserted within the two strips of the reinforcement member and energized by a frequency source 202. In this way, one inner joint 30a is first formed and the energy need only pass through a few fabric layers. Subsequently, the reinforcement member 50 can be flattened and the other panel 22a put in place and the other joint 30a and peripheral joint 30 formed. Alternatively, the reinforcement member 50 can be placed on panel 22b and panel 22a positioned thereon as shown in FIG. 3D. Thereafter radiant energy can be applied simultaneously to all fabric layers creating joints 30a (and/or 30b) and joint 30. The size and shape of the RF generator can be made to conform to the shape of the entire joint to be created. As an example, the RF generator can be of an annular rectangular shape to conform to the perimeter of the joint 30 and of sufficient width to also create one or both of the joints 30a and 30b. Also the RF generator can be smaller than the entire joint to be formed; in this case the generator 200 is moved to various locations on the panels to create the joints in a piecemeal manner.

When the cushion 20 of FIGS. 3A and 3B is subjected to the outward, expansion forces of the inflation gas, the panels 22a and 22b will tend to move apart as illustrated in FIG. 3B in the way they tended to move apart as illustrated in FIG. 1C. However, the loading characteristics in the vicinity of the joint 30 and member 50 are changed. As can be appreciated, the additional lap joints 30a are also subject to a shearing load. The panels 22a and 22b are prevented from peeling apart by virtue of the seamed construction of the reinforcement member 50 which is resistant to peeling loads. Even if inflation gas migrates through to the seam 56a to the outside segments 60 of the reinforcement 50, such gas will be trapped within the cushion 20 by virtue of the joint (seam or seal) 30. Further, it should be appreciated that the sewn seam 56a is located completely interior to the panels 22a and b and does not create any leak paths in the panels.

Reference is briefly made to FIGS. 4A and 4B which illustrate a further embodiment of the invention. FIG. 4A illustrates a cushion 20a made from a single piece of material such as an enlarged panel 22a. Numeral 70 illustrates the centerline of the panel. In this construction the cushion 20a is formed by folding the material panel in half to form both panel 22a and 22b yielding the configuration shown in FIG. 4B. As can be appreciated, the lower edge 72 of cushion 20a is closed and as such, neither a peripheral joint 30 nor reinforcement member 50 is needed across this closed edge. A three-sided reinforcement member 50a and the joint 30 extend about the perimeter of the remaining edges or portions of the cushion 20a and extend down to seal and reinforce the cushion 20a proximate the edge 72. It should be appreciated that the perimeter of the cushion 20a can be circular, oval, rectangular or any other shape and can be made from one or more panels of material.

From the above, it should be appreciated that one of the benefits of the present invention is that the construction of the cushion 20 or 20a, and placement of the reinforcement members 50 and the generation of the various joints 30, 30a and 30b can be achieved while working upon a flat work surface.

Reference is made to FIG. 5 which illustrates an inflatable cushion 100 designed for use as an inflatable side impact curtain. The construction of cushion 100 utilizes many of the features of the air bag shown in FIGS. 3A–4B. Obviously, this bag is considerably longer and designed to extend from about the location of a vehicle's A-pillar (see numeral 102) across the B-pillar (numeral 104) to the C-pillar (numeral 106). Prior to activation, the cushion 100 is rolled or folded into a compact configuration resembling a long, thin cylinder and installed proximate the roof rail of the vehicle on the interior of the passenger compartment. This configuration is concealed by a trim piece (not shown) that is moved or torn away upon inflation of the cushion 100. This cushion deploys downwardly from its mounting location across the front and rear side windows of the vehicle and typically will extend to about shoulder height of a normally sized occupant although bags that extend down lower to protect the lower arm and torso can be used. The illustrated bag primarily provides head impact protection during a side impact collision or when the vehicle has rolled over. The cushion 100 may comprise a plurality of panels such as a front and rear panel 22a and 22b similar to that shown in FIG. 1B or, alternatively, a single panel of material may be used following the construction shown in FIGS. 4A and 4B. The periphery of the inflatable portion 100a of cushion 100 is enclosed by a joint 110 having side portions 110a and 110b and a top portion 110c. These portions can be integrally formed or separately formed. If the cushion 100 is formed utilizing separate front and rear panels, the joint 100 also includes a lower portion 110d. In the preferred embodiment of the invention, the cushion 100 utilizes a multi-layered fabric comprising the structural nylon layer and a sealable or bondable polyurethane layer. Other elastomeric materials such as polyethylene vinyl or nylon can be used. Top joint portion 110c may be segmented into a plurality of parts defining airflow passages 111 therebetween. The inflatable portion 100a is separated into first and second inflatable sections 112a and 112b and a center section 114. This center section 114, enclosed by a rectangular joint 126, in the illustrated embodiment is fully enclosed and is not inflated. As can be appreciated, this center portion 114 is located just behind the B-pillar. Alternatively, this center section 114 can be opened to inflation gas. The cushion 100 additionally includes an additional joint 120 which runs parallel to joint 110c and which, in combination with joint 110c, defines a tubular channel 122 as shown in FIG. 5A. Each of the inflatable portions 112a and 112b are joined together by respective separating joints (seams or seals) 124a and 124b. The purpose of joints 124a and 124b is to limit the inflated size of the sections 112a and 112b and is optional. A border portion 130 of the cushion 100 extends beyond the joint 120. The corresponding portions of the panels 22a and 22b forming this border can be joined together or loosely abut each other. This border portion need not be sealed as completely or with as much energy as the joints immediately about the inflated portion 100a. A flexible tube 123 is inserted in the tubular channel 122. One end of the tube is connected to an inflator 125 which provides inflation gas. The tube 123 includes a plurality of openings to communicated inflation gas into the inflatable portion 100a of the cushion. The lower portion of the cushion 100 may include tethers 127 to prevent the cushion from moving away from the side of the vehicle.

As mentioned above, each of the bonds, seals or joints 110 (110a–110d, 120, 124a and 124b) can be bonded or sealed together utilizing radiant energy (RF, heat, etc). Experience has shown that an adequate width for these joints is about 13 mm. To prevent each of the above-mentioned bonds or joints from peeling apart as the cushion 100 is inflated, one or more of these bonds or joints can be reinforced in the manner as illustrated in FIGS. 2B and 3B. It should be appreciated that each of the joints of the cushion need not be reinforced by a reinforcement member 50. The gas flow pattern and pressure distribution in each cushion will differ and reinforcement members can be added as needed. Reference is briefly made to the dotted lines designated by numerals 50a–50b which illustrate reinforcement members, positioned between the panels 22a and 22b forming the cushion 100. Each segment 110a–110d of the seal or joint 110 can also include a reinforcement member constructed similar to that shown in FIG. 3B. This reinforcement member has not been shown in FIG. 5 to keep this figure as simple as possible.

Figure 6:
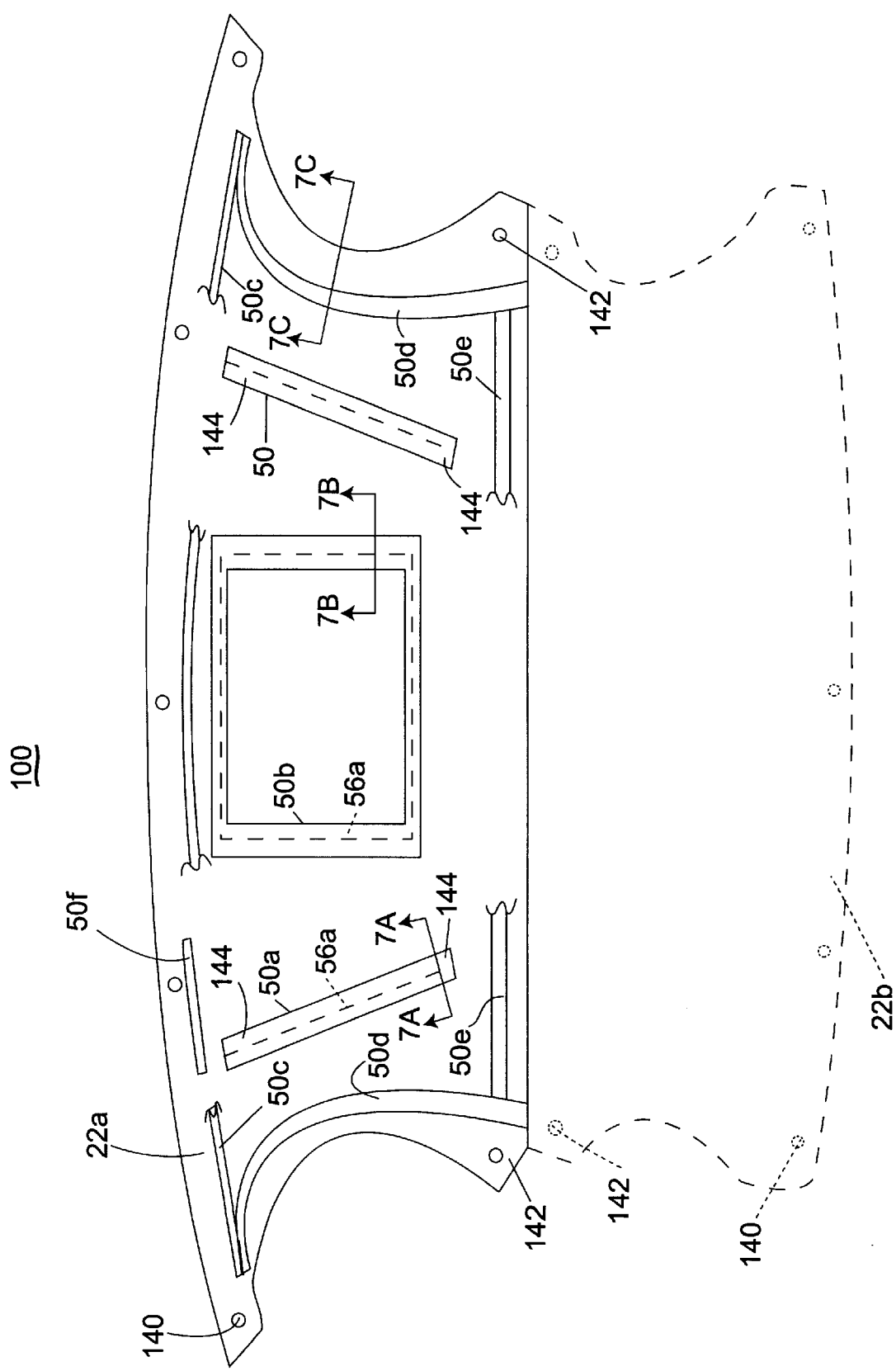
FIG. 6 shows a manufacturing step in the construction of the cushion of FIG. 5.

The following describes the method of constructing a cushion 100 in accordance with the present invention. FIG. 6 represents a plan view of a rear panel 22a of cushion 100. The panel 22a includes a plurality of mounting openings 140 located in the border 130. Additional mounting openings 142 are located in the lower right and left-hand extremes of the panel. The panel is laid flat upon a work surface having a plurality of pins extending outwardly therefrom. The pins are positioned at the location of the openings 140 and 142. In this manner, panel 22a can be laid flat upon the work surface and oriented by the pins. By way of illustration, if the cushion 100 is constructed of a single piece of material, this single piece of material will form both the rear panel 22a and front panel 22b of the cushion. The front panel 22b is shown in phantom line and would also include the openings 140 and 142. However, in this first step, the front panel portion 22b of this single piece of material would extend off of the work surface.

Returning to FIG. 6, in the orientation shown, the facing surface of panel 22a is the bondable layer of material such as polyurethane, polyethylene, vinyl or nylon. Thereafter, straight lengths of reinforcement members 50a are laid upon panel 22a in their desired orientation.

The construction of these linear strips of reinforcement members 50a–b is identical to the construction shown in the cross-sectional view of FIG. 2B, that is, two strips of the multi-layered fabric are laid upon each other with the bondable layers 26 facing outwardly. Thereafter, the strips 52a and 52b forming member 50a are sewn together by one or more lines of stitches of thread shown by numeral 56a.

These strips may then be RF tack welded such as at locations 144 to the bondable layer 26 of panel 22a. The center, rectangularly shaped reinforcement member 50b is also placed upon panel 22a. The construction of the center reinforcement member is identical to that shown in FIGS. 2A and 2B with the exception that its size is scaled appropriately. Additional reinforcement members such as 50c–e can be laid upon panel 22a proximate the location of the joints 110a–110d if and where appropriate. It should be appreciated that reinforcement member 50e is not needed if the cushion is made from a single piece of material. Each of these reinforcement members can be temporarily secured in place by one or more RF tack welds at appropriate locations. The various inner and outer portions 58 and 60 of each of the reinforcement members are bonded to an adjacent portion of the inner and outer panels 22a and 22b respectively. Thereafter, panel 22b is overlaid upon panel 22a, of course with its bondable layer facing the bondable layer of panel 22a. Thereafter, the joints 30a, 30b, 110a–d, 120, 124a,b and 126 are created either simultaneously or sequentially.

Reference is briefly made to FIGS. 7A–7B as well as FIG. 3B which illustrate the resulting lap joints created between the various reinforcement members 50a, 50b and 50c. In each case, the reinforcement members provide for the increased tensile strength of the cushion in an area immediately proximate the respective joints 110a–d, 120, 124a, 124b and 126 while providing increased resistance to peeling.

Many changes and modifications in the above-described embodiment of the invention can, of course, be carried out without departing from the scope thereof. Accordingly, that scope is intended to be limited only by the scope of the appended claims.

What is claimed is:

1. An inflatable cushion (100,100a) comprising: a first panel (22a) and a second panel (22b) attached together generally along a peripheral joint (30) to form the inflatable cushion which is inflated upon receipt of inflation gas, the joint being subjected to a shearing or peeling load upon inflation of the cushion tending to separate the panels, each of the first and second panels including a first layer (24) comprised of a flexible, structural material and a second bondable layer (26), the bondable layer formed of material that is joinable to an adjacent, facing bondable layer to form the peripheral joint;

reinforcement means (50) for preventing the joint (30) from separating including:

a first strip of material (52a) having a structural layer and a bondable layer, and a second strip of material (52b) having a structural layer and a bondable layer;

the first and second strips being overlaid and sewn together at a seam (56a) to retard separation of the strips, the seam separating each of the strips into two portions (50,60), wherein the structural layers face each other and the bondable layers face outwardly toward a corresponding bondable layer of the first and second panel;

wherein the bondable layers of the first and second strips are joined on one or both sides of the seam to a corresponding bondable layer of one or the other panel.

2. The cushion as defined in claim 1 wherein the first and second panels are formed by folding over a single piece of material.

3. The cushion as defined in claim 1 wherein the cushion is an air bag for protecting occupants of a vehicle during an accident.

4. The cushion as defined in claim 3 wherein the air bag is divided into two or more inflatable portions (112a,b).

5. The cushion as defined in claim 4 wherein each inflatable portion is joined together at an inner joint, each of the joints being subjected to a peeling load upon inflation of the cushion.

6. The cushion as defined in claim 5 further including secondary reinforcement means for preventing such peeling of the inner joints.

7. The cushion as defined in claim 6 wherein the secondary reinforcement means is located adjacent the inner joint and comprises: a third strip of material having a structural layer and a bondable layer, and a fourth strip of material having a structural layer and a bondable layer;

the third and fourth strips being overlaid and sewn together at a seam to retard separation of the strips, the seam separating each of the strips into two portions, wherein the structural layers face each other and the bondable layers face outwardly abutting a corresponding bondable layer of the first and second panel;

wherein the bondable layers of the third and fourth strips are joined on one or both sides of the seam to a corresponding bondable layer of one or the other panel.

8. The cushion as defined in claim 3 wherein the air bag is a rollover air bag.

* * * * *